United States Patent Office 3,469,439
Patented Sept. 30, 1969

3,469,439
MEANS FOR MEASURING DISTRIBUTED FORCES USING MICROCAPSULES
Sanford B. Roberts, 8014 Cozycroft Ave., Canoga Park, Calif. 91306, and Lewis P. Felton, 10603 Butterfield Road, Los Angeles, Calif. 90064
No Drawing. Filed Feb. 21, 1968, Ser. No. 707,323
Int. Cl. G01n 3/00; B01j 13/00
U.S. Cl. 73—88                                                      7 Claims

ABSTRACT OF THE DISCLOSURE

An article of manufacture for measuring distributed forces over a surface comprising a substantially homogeneous mixture of discrete groups of microcapsules of differing pressure sensitivity. Such article, when applied to a pressure-subjected surface, is capable of providing a permanent record of the pressure to which each portion of the surface is subjected. The size and wall characteristics of the groups of the microcapsules are controlled to provide groups of microcapsules breaking at different pressures and the internal phase, which may be solid or liquid, is chosen to provide a color record corresponding to the different breaking pressures of the microcapsules.

Background of the invention

This invention relates to means for measurement and, more particularly, relates to an article of manufacture for indicating the pressures to which a surface has been subjected.

Heretofore, contact force or pressure measuring devices have measured force by relating the force to a measured displacement or deformation of the object or material subjected to the force. Although microscopic forces applied to a surface have been measured by integrating their effect over a macroscopic area, for example, by using pressure calibrated transducers positioned at discrete points on the surface which is being subjected to pressure, the sensing devices applied to the surface have macroscopic dimensions and therefore change the geometry of the surface to which they are attached. The measured forces are therefore not an accurate measurement of the forces applied to the surface in the absence of the sensing devices. Additionally, the presently-employed methods of measuring microscopic forces require the use of complex electrical equipment including, for example, strain gauges.

To overcome the present limitations and problems presently associated with force or pressure measurement, it is proposed to employ microcapsules. Microencapsulation is a relatively new technique for "packaging" materials which may be solid, liquid or gaseous in physical form. This technique involves coating or encapsulating a material, which is described as the "internal phase," with a second material which is the "external phase" or "wall" material. Prior to handling of the microcapsules, the wall material is hardened so that the wall material becomes relatively impermeable to the internal phase.

Heretofore, microcapsules have been employed to make an imprint on a page when subjected to a force, for example, such as that applied by a typewriter. This use of microcapsules together with a method of forming a pressure-sensitive microcapsular layer is described, for example, in U.S. Patent No. Re. 24,899 to B. K. Green, issued Nov. 29, 1960. The microcapsules employed for printing papers and the like are apparently intended to be substantially homogeneous with respect to breaking pressure, that is, they are intended to break at substantially the same pressure. Additionally, they are subjected to a substantially constant pressure.

Thus, there has been no attempt to employ groups of calibrated microcapsules which break at different pressures to provide a record of pressure variations to which a surface has been subjected.

Summary of the invention

This invention relates to an article of manufacture which comprises a homogeneous mixture of discrete groups of microcapsules of differing pressure sensitivity. The microcapsules have an internal phase which may be solid or liquid. However, whether solid or liquid, the internal phase is chosen so that it produces a color or color change when the microcapsule is broken. A different color or color change may be provided for each discrete group of microcapsules so that breaking of the microcapsules provides a record of the pressure to which each area of a body is subjected. Alternatively, a single color may be produced by the broken microcapsules. Using a single color, the pressure may be determined by correlating pressure with density of color using a densitometer.

Because the forces applied to a body are determined by breaking the microcapsules and not by deformation of the body, no complex and expensive equipment is required. Additionally, tests can be conducted simply by "painting" the microcapsules on a surface which is then subjected to pressure. Thus, the time consumed in setting up complex measurement devices is eliminated.

Microcapsules can be made extremely sensitive to pressure by controlling the size and wall thickness. Therefore, extremely small pressures or pressure changes can be measured by this invention. Additionally because the microcapsules themselves can be made very small, areas of a surface subjected to varying pressure can be sharply defined.

Description of the preferred embodiment

The compositions of this invention comprise discrete groups of microcapsules. The microcapsules in any one group break at substantially the same pressure. However, the pressure-sensitivity of the microcapsules in any one group differs from the pressure-sensitivity of the microcapsules in any other group. Dispersion of the different microcapsules throughout the total composition is substantially uniform or homogeneous. When broken, the microcapsules provide a color, color change, or color density change which is pressure-related so that a record of pressure changes and variations is produced. The microcapsule compositions of this invention may be applied directly to a surface or the microcapsules may be mixed with, for example, an adhesive, and thereafter applied to a surface where a more permanent application is required. Additionally, the microcapsules may be applied to a sheet, for example, a plastic sheet, which, in turn, can be bonded to the surface being subjected to pressure.

When a force is applied to a surface coated with the microcapsule composition of this invention, the most pressure-sensitive microcapsules first break and, as the pressure increases, the less pressure-sensitive microcapsules break, in sequence, in proportion to their pressure-sensitivity. If a plurality of colors is employed, the maximum pressure to which a particular point on a surface is subjected is thus indicated by a color produced by the microcapsules breaking at that pressure. If another point on the surface adjacent to this point is subjected to a different maximum pressure, a different color will be produced at the other point. If a single color is employed, the different pressures to which the foregoing two points on a surface are subjected, wll be determined by a different density of color at the two points. That is, the point subjected to the higher pressure will have a higher density of color than the point subjected to a lower pressure. Thus, the pressure history at a given point and the pressure history across a surface can be determined using the composition of this invention.

As previously stated, the composition of this invention comprises a mixture of discrete groups of microcapsules, each group of microcapsules being sensitive to a different breaking pressure. The pressure at which a particular microcapsule breaks is dependent upon a number of variables such as capsule size, wall and internal phase material, and wall thickness. Since each of these variables is controllable, microcapsules can be tailored to break at any desired pressure. Thus, by strict control of these variables, microcapsules can be made which differ greatly, in burst strength, for example, by 100 p.s.i., or which differ only slightly in burst strength, for example, by 0.1 p.s.i. In general, the more sensitive the pressure test, the less are the burst strength differences among the groups of microcapsules employed.

The microcapsules which are employed in this invention, are discrete microcapsules. As used herein and in the claims, the term "discrete microcapsules" refers to microcapsules which have a single internal phase droplet or pellet surrounded by a wall.

The size of the microcapsules used herein may vary greatly and depends upon the particulate application for which the microcapsules are intended. Preferably, the microcapsules have a size which permits them to be readily dispersed in binder or vehicle which can then be attached or spread on a surface. In general, the size of the microcapsules may range from about 0.1 micron to a few millimeters.

As earlier mentioned, burst strength is a function, among other things, of size of microcapsule. Although substantially all of the microcapsules in a particular discrete group of microcapsules will have substantially the same size, the microcapsulation in a discrete group may differ in size from the microcapsules in another discrete group. That is, capsule size may be the variable employed to provide different burst strengths.

It will be understood that it is impossible, for practical purposes, to form a group of microcapsules in which all of the microcapsules in the group are identical, that is, which have identical burst strengths. Therefore, there will always be some variation in burst strength among the microcapsules within any one group. The allowable differences or variation from the average burst strength of the group will depend upon the pressure sensitivity required of a particular mixture of groups of microcapsules. Thus, if the pressure sensing test is such that only pressures which vary widely from each other are to be measured, the burst strength differences between groups of microcapsules will be correspondingly large so that the burst strengh variations within a particular group of microcapsules may be relatively large without having microcapsules in that particular group breaking at pressures which also break microcapsules in other groups within the total composition. Conversely, tests using the microcapsule compositions of this invention which are intended to measure relatively small changes in pressure must employ microcapsule compositions in which the differences in burst strength between microcapsule groups is relatively small and, therefore, the burst strength differences among microcapsules in a particular group will be correspondingly small. In this way, pressures varying from each other by either small or large increments can be measured and faithfully recorded.

It is also within the scope of this invention to employ microcapsule compositions in which the burst strength range of each of the microcapsule groups in the composition overlaps the burst strength range of other groups. That is, when such a composition is subjected to certain pressures, some microcapsules in each of two pressure-sensitive adjacent groups will break. The result is that, instead of obtaining sharply defined color differences, a blended color which is a combination of the colors in each of the two microcapsule groups will be obtained. Thus, continuous pressure changes, as compared with incremental pressure changes, may be recorded by a color spectrum produced as a result of the aforedescribed overlapping of burst strength ranges.

The microcapsules may be made by a number of known methods. It is only necessary that the method selected be capable of producing batches of microcapsules in which substantially all of the microcapsules in a batch have substantially the same burst strength. That is, the selected method should be capable of producing a batch of microcapsules in which the burst strength of substantially all of the microcapsules varies within about 5% of the average burst strength of the microcapsules in that batch.

Microencapsulation processes which may be employed to produce the microcapsules of this invention include both chemical and mechanical processes. Chemical microencapsulation processes include phase separation from both aqueous and organic solvent solutions, solvent exchange in preformed capsules, interfacial polymerization and melt techniques. Mechanical methods include vacuum metallizing, fluidized bed coating and centrifugal casting.

In the chemical phase separation method, a colloid is added to a vehicle to produce a solution or pseudo solution and to this solution or pseudo solution is added an insoluble component which later becomes the internal phase. The characteristics of the vehicle are altered, for example, by changing the pH, so that the colloid comes out of solution and forms about the insoluble material to form a coacervate or aggregate of colloidal particles. The wall material is solidified before the capsule is removed from solution, for example, by drying, tanning or polymerizing the wall material. This method can be reversed by using as the internal phase any water-soluble liquid or solid, including water itself, and by using as the wall material a water-insoluble polymer such as polyethylene, polystryrene and ethyl cellulose. The only requirement is an ability to form a solution in one area of a ternary phase diagram and to come out of solution in another.

The solvent exchange method comprises forming a microcapsule by the previously described phase separation technique and thereafter exchanging the internal phase with the desired material by controlled permeation through the capsule wall. The walls are hardened after the exchange of the internal phase materials.

The melt technique employs a meltable composition such as waxes and other polymer solutions which are melted and dispersed in a hot immiscible liquid vehicle by aggitation and the potential internal phase, which is insoluble in the vehicle, is added and likewise dispersed. Physical forces, related to the relative solubilities of the two materials to each other and to the vehicle, cause the molten wall material to form a sheath around the internal phase. When the temperature of the mixture is lowered, the wall material solidifies and the microcapsules are thereby formed.

Interfacial polymerization employs a polymer-forming reaction at the surface of droplets of the internal phase brought about by a second reactant dissolved in the vehicle. The reactants are those which normally form condensation polymers or complexes. Too much of the second reactant produces solid spheres.

Methods of producing microcapsules by chemical methods are described in the following patents and are incorporated by reference: U.S. Patent No. 3,016,308 to N. Macaulay, issued Jan. 9, 1962; U.S. Patent No. 2,800,458 to B. K. Green, issued July 23, 1957; and U.S. Patent No. 3,173,878 to Z. Reyes, issued Mar. 16, 1965.

An example of a mechanical method is a method which employs a rotating wall having a plurality of holes over which is coated a film material which later becomes the wall material of the capsules. Counter-rotating within the wall is a disc onto which are dropped a series of particles which are whirled outwardly and pass through the openings in the unit wall. As they do so the particles are coated by the membrane-type film. This method is more fully described in U.S. Patent No. 3,015,128 to G. R. Somerville, issued Jan. 2, 1962.

The external phase or wall may be made from a variety of polymeric materials including both organic and inorganic materials. The wall must be made from a material which will not melt, vaporize or otherwise fracture, except by externally-applied pressure. Examples of materials which may be used to form the walls of the microcapsules are: acrylate and methacrylate resins, such as polymethylmethacrylate and polyacrylic acid; alkyd resins, such as those produced from esters of ethylene glycol and terephthalic acid; animal glues; and casein.

The wall materials may also be modified to provide the desired degree of hardness. For example, the following plasticizers may be used: adipic acid esters, such as dioctyl adipate and dibutyl adipate; biphenyl derivatives, such as chlorinated biphenyl; glycol derivatives, such as polyethylene glycol of molecular weight of 200 to 20,000, polypropylene glycols, ethylene glycol dibutyrate and ethyl phthalyl ethyl glycolate; hydrocarbons, such as butyl or isooctyl esters and glycol ethers of lauric, oleic, citric, abietic, adipic, azelaic, benzoic, palmitic, phosphoric acids, and phthalic acid derivatives, such as dimethyl-, diethyl, dibutyl-phthalates.

To provide the colors produced upon bursting of the microcapsules, the microcapsules are provided with an internal phase which is colored or which is color producing. The color-producing, internal phase materials are materials which may themselves not be colored, but which produce colors upon, for example, contact with air when the capsule is burst or recation with another material in the microcapsule which is shielded from the internal phase before the microcapsule is broken, but which contacts the internal phase when the microcapsule is broken. The latter reaction, and the formation of microcapsules therefor, is fully described in U.S. Patent No. 3,179,600 to B. W. Brockett, issued Apr. 20, 1965.

In general, the internal phase comprises two components—the colored or color-forming component (hereafter "color component") and a fluid capable of suspending or dissolving the colored or color-forming component—although it will be understood that the internal phase may be a single component which is colored or color-forming. Preferably, the internal phase has a low volatility to provide the microcapsules with a relatively long shelf life, i.e., to reduce loss of internal phase through the microcapsule walls. Additionally, the internal phase preferably has a high boiling point to reduce volatility at elevated use temperatures and to prevent fracturing of the microcapsules at elevated temperatures due to internal pressure.

Fluids which may be employed to suspend or dissolve a colored or color-forming component are glycols such as polyethylene glycol, dipropylene glycol and thiodiethylene glycol; phthalates such as dioctyl phthalate and dibutyl phthalate; maleates such as dibutyl maleate and di(2-ethyl hexyl) maleate; and cottonseed and rapeseed oils. Colored or color-forming components which may be dissolved or suspended in the foregoing fluids are carbon blacks, iron blues, phthalocyanines, cadmium reds, phospho- and molybdotungstic acid laked colors, triphenylmethane, azo dyes, diazonium dyes, anthraquinone dyes, acridine dyes, oxazine dyes and thiazine dyes.

The microcapsule compositions of this invention may be dispersed in a variety of materials or binders to produce a coating which can be applied to a surface which is to be subjected to pressure. The binder need serve only as an adhesive to hold the microcapsules to the surface. Thickness of the binder layer may vary but may be and is preferably less than the thickness required to cover the microcapsules to permit easy recognition of the colors produced upon breaking of the capsules. The binders may be aqueous or non-aqueous but should not dissolve or otherwise attack the wall material of the microcapsules. That is, the binder material should be inert to the wall material. Dispersion of the microcapsules in the binder must be such as to produce a substantially homogenous dispersion of the microcapsules in the binder so that a true record of pressure can be obtained.

This technique can be used for measuring pressures which exist between bodies in contact as well as pressures which are exerted by fluids on bodies immersed therein. An example of the latter is that of an aerodynamic surface (airfoil) in an airstream. No measurements of the point by point pressure distribution on an aerodynamic surface have heretofore been obtainable. By using this invention an airfoil may have bonded to it a thin, homogeneous mixture fo microcapsules consisting of, for example, three or four discrete groups of microcapsules of differing pressure sensitivity, the lowest strength group having a burst pressure of approximately 1 p.s.i. and the highest strength group having a burst pressure of approximately 10 p.s.i. The airfoil may then be placed in a wind tunnel. The airstream velocity may be slowly increased and the color or color density changes in the microcapsules monitored and correlated with airstream velocity. The color changes which take place in the microcapsules provide a permanent record of the maximum pressures which acted upon the airfoil at each point on its surface. Color photography may be used to obtain a time varying record of the surface pressures on the airfoil as a function of time.

Modifications may be made in the described microcapsule composition by those skilled in the art without departing from the spirit of the invention. For example, the microcapules may be preferentially arranged to indicate components of force. Therefore, this invention is to be limited only by the appended claims.

We claim:

1. An article of manufacture for measuring and recording pressure variations, comprising a substantially homogeneous mixture of discrete groups of pressure-sensitive microcapsules adapted to be affixed to a surface, each of said discrete groups of microcapsules having a predetermined average burst strength different from the average burst strengths of any other of said groups.

2. The article of claim 1 wherein a binder is substantially uniformly dispersed in said mixture for permanent application to a surface.

3. The article of claim 1 wherein the burst strengths of all of the microcapsules in each of said groups lie within a given burst strength range different from that of any other group whereby none of said burst strength ranges overlap.

4. The article of claim 1 wherein the burst strengths of all of the microcapsules in each of said groups lie within a burst strength range and wherein each of said burst strength ranges overlaps adjacent burst strength ranges, whereby pressure ranges are continuously recorded.

5. The article of claim 1 wherein said microcapsules comprise an external phase substantially impermeable to an internal phase, said internal phase being capable of indicating fracture of said microcapsules by producing a color and wherein the burst strength of each of said groups of said microcapsules is characterized by a different color.

6. The article of claim 1 wherein said microcapsules comprise an external phase substantially impermeable to an internal phase, said internal phase being capable of indicating fracture of said microcapsules by producing a color, said color being the same for all said microcapsules whereby said pressure variations are indicated by variations in density of said color.

7. A sheet material having a surface thereof coated with a substantially homogeneous mixture of discrete groups of pressure-sensitive microcapsules, each of said groups of microcapsules having a predetermined average burst strength different from the average burst strengths of any other of said groups.

References Cited

UNITED STATES PATENTS

| | | | |
|---|---|---|---|
| Re. 24,899 | 11/1960 | Green | 252—316 |
| 2,724,964 | 11/1955 | Sindale | 73—88 |
| 3,072,481 | 1/1963 | Berman et al. | 96—48 |
| 3,317,433 | 5/1967 | Eichel | 252—316 |

RICHARD C. QUEISSER, Primary Examiner

JERRY W. MYRACLE, Assistant Examiner

U.S. Cl. X.R.

252—316